US010614233B2

United States Patent
Avrahami et al.

(10) Patent No.: US 10,614,233 B2
(45) Date of Patent: Apr. 7, 2020

(54) MANAGING ACCESS TO DOCUMENTS WITH A FILE MONITOR

(71) Applicant: International Business Machines Corporation, Armonk, NY (US)

(72) Inventors: Shlomit Avrahami, Jerusalem (IL); Itai Gordon, Modiin (IL); Elik Katz, Jerusalem (IL); Yakir Keisar, Toronto (CA); Ilan D. Prager, Beit Shemesh (IL); Denis Voloshin, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 15/662,269

(22) Filed: Jul. 27, 2017

(65) Prior Publication Data
US 2019/0034647 A1   Jan. 31, 2019

(51) Int. Cl.
G06F 21/60 (2013.01)
G06F 21/62 (2013.01)
G06F 21/55 (2013.01)
G06F 21/53 (2013.01)

(52) U.S. Cl.
CPC .......... *G06F 21/604* (2013.01); *G06F 21/53* (2013.01); *G06F 21/554* (2013.01); *G06F 21/6209* (2013.01); *G06F 21/6254* (2013.01); *G06F 2221/2141* (2013.01)

(58) Field of Classification Search
CPC .. G06F 21/604; G06F 21/554; G06F 21/6209; G06F 2221/2141
See application file for complete search history.

(56) References Cited

U.S. PATENT DOCUMENTS

| 6,711,687 | B1 * | 3/2004 | Sekiguchi | G06F 21/552 713/186 |
| 7,043,634 | B2 * | 5/2006 | Wolff | G06F 21/565 705/51 |
| 7,530,106 | B1 * | 5/2009 | Zaitsev | G06F 21/577 713/164 |

(Continued)

OTHER PUBLICATIONS

Avrahami et al., "Managing Access to Documents with a File Monitor," U.S. Appl. No. 15/856,455, filed Dec. 28, 2017.

(Continued)

*Primary Examiner* — David J Pearson
*Assistant Examiner* — Badri Narayanan Champakesan
(74) *Attorney, Agent, or Firm* — Nathan M. Rau

(57) ABSTRACT

Disclosed herein is a system and method that can retrieve, via a file monitor, a file and policy data from a case management system or a content management system, wherein the file and the policy data are retrieved in response to detecting a user request for the file. A processor can also modify, via the file monitor, access to the file based on the policy data, and intercept a plurality of document management instructions executed with the file. The processor can also detect at least one of the document management instructions is a malicious action, wherein the malicious action is detected based on the policy data, wherein the policy data is updated in response to detecting each of the document management instructions. Additionally, the processor can execute a policy instruction to prevent execution of the at least one document management instruction.

17 Claims, 6 Drawing Sheets

(56) References Cited

U.S. PATENT DOCUMENTS

| | | | |
|---|---|---|---|
| 8,499,349 B1* | 7/2013 | Cruz | G06F 21/568 726/24 |
| 8,751,607 B2* | 6/2014 | Jenkins | G06Q 20/123 709/219 |
| 8,850,010 B1 | 9/2014 | Qureshi | |
| 9,037,608 B1* | 5/2015 | Sobel | G06F 16/90344 707/783 |
| 9,245,132 B1* | 1/2016 | Newstadt | G06Q 10/107 |
| 9,253,214 B1* | 2/2016 | Pillai | G06F 21/552 |
| 9,691,027 B1* | 6/2017 | Sawant | G06F 21/604 |
| 9,767,302 B2* | 9/2017 | Lim | G06F 21/604 |
| 9,990,511 B1* | 6/2018 | Dreyfus | G06F 21/6218 |
| 2006/0212486 A1* | 9/2006 | Kennis | G06F 21/55 |
| 2009/0044024 A1* | 2/2009 | Oberheide | G06F 21/562 713/188 |
| 2009/0070881 A1* | 3/2009 | Yellepeddy | G06F 21/6245 726/26 |
| 2010/0161967 A1* | 6/2010 | Roegner | G06F 21/6218 713/155 |
| 2010/0241844 A1* | 9/2010 | Hussain | G06F 21/6218 713/150 |
| 2012/0150773 A1* | 6/2012 | DiCorpo | G06Q 10/0631 706/12 |
| 2013/0333021 A1* | 12/2013 | Sellers | G06F 21/57 726/17 |
| 2014/0013112 A1* | 1/2014 | Cidon | G06F 21/6218 713/165 |
| 2014/0053252 A1* | 2/2014 | Kelsey | H04L 63/06 726/6 |
| 2014/0115116 A1* | 4/2014 | Motes | H04L 67/06 709/219 |
| 2014/0165137 A1* | 6/2014 | Balinsky | G06F 21/554 726/1 |
| 2016/0026819 A1* | 1/2016 | Malik | G06F 21/6218 726/1 |
| 2016/0217276 A1* | 7/2016 | Choi | G06F 21/10 |
| 2016/0277368 A1* | 9/2016 | Narayanaswamy | G06F 21/6218 |
| 2016/0285835 A1* | 9/2016 | Linga | G06F 16/93 |
| 2017/0004291 A1* | 1/2017 | Pathak | G06F 21/10 |
| 2017/0091482 A1* | 3/2017 | Sarin | G06F 21/6245 |
| 2017/0235966 A1* | 8/2017 | Ray | G06F 21/6218 713/165 |
| 2018/0027006 A1* | 1/2018 | Zimmermann | H04L 63/0245 726/11 |
| 2019/0087572 A1* | 3/2019 | Ellam | G06F 21/12 |

OTHER PUBLICATIONS

List of IBM Patents or Patent Applications Treated as Related, Signed Dec. 28, 2017, 2 pages.

"Symantec Data Loss Prevention," Symantec Products, printed 22 Jun. 2017, pp. 1-6. https://www.symantec.com/products/information-protection/dlp/data-loss-prevention.

"Imperva SecureSphere—File Activity Monitor," Imperva File Security Products, printed Jun. 22, 2017, pp. 1-2. http://www.dataguardstore.com/File-Activity-Monitoring.asp.

* cited by examiner

200

300

MANAGING ACCESS TO DOCUMENTS WITH A FILE MONITOR

BACKGROUND

The present disclosure relates to managing access to documents, and more specifically, but not exclusively, to managing access to documents with a file monitor.

SUMMARY

According to an embodiment described herein, a system for managing access to documents can include a processor to retrieve, via a file monitor, a file and policy data from a case management system or a content management system, wherein the file and the policy data are retrieved in response to detecting a user request for the file. The processor can also modify, via the file monitor, access to the file based on the policy data and intercept, via the file monitor, a plurality of document management instructions executed with the file. Additionally, the processor can detect, via the file monitor, at least one of the document management instructions is a malicious action, wherein the malicious action is detected based on the policy data. In some examples, the policy data is updated in response to detecting each of the document management instructions. Furthermore, the processor can execute, via the file monitor, a policy instruction to prevent execution of the at least one document management instruction.

According to another embodiment, a method for managing access to documents can include retrieving, via a file monitor, a file and policy data from a case management system or a content management system, wherein the file and the policy data are retrieved in response to detecting a user request for the file. The method can also include modifying, via the file monitor, access to the file based on the policy data and intercepting, via the file monitor, a plurality of document management instructions executed with the file. Additionally, the method can include detecting, via the file monitor, at least one of the document management instructions is a malicious action, wherein the malicious action is detected based on the policy data, wherein the policy data is updated in response to detecting each of the document management instructions. Furthermore, the method can include executing, via the file monitor, a policy instruction to prevent execution of the at least one document management instruction.

According to another embodiment, a computer program product for managing access to documents can include a computer readable storage medium having program instructions embodied therewith, wherein the computer readable storage medium is not a transitory signal per se. The program instructions can be executable by a processor to cause the processor to hook into event calls or modify an operating system to execute the file monitor, wherein the file monitor is to monitor, at a kernel level of the operating system, a plurality of system calls involving locally stored files. The program instructions can also be executable by a processor to cause the processor to retrieve, via a file monitor, a file and policy data from a case management system or a content management system, wherein the file and the policy data are retrieved in response to detecting a user request for the file. The program instructions can also be executable by a processor to cause the processor to modify, via the file monitor, access to the file based on the policy data and intercept, via the file monitor, a plurality of document management instructions executed with the file. Additionally, the program instructions can be executable by a processor to cause the processor to detect, via the file monitor, at least one of the document management instructions is a malicious action, wherein the malicious action is detected based on the policy data. In some examples, the policy data is updated in response to detecting each of the document management instructions. The program instructions can also cause the processor to execute, via the file monitor, a policy instruction to prevent execution of the at least one document management instruction.

DETAILED DESCRIPTION

Document management systems, such as content management systems and case management systems, can enable users to download or retrieve files. Accordingly, users can access the downloaded files in an offline environment. In some examples, the content management systems or case management systems can restrict user access to files based on user permissions. However, user permissions for files can change with time. Thus, a user may retrieve or download a file from a content management system or a case management system and access the file despite the user permission changing subsequent to the file retrieval.

In some embodiments described herein, a device can manage access to documents with a file monitor, among other components. The device can apply changes to a user's access to data subsequent to a user retrieving or downloading a file. For example, the device can retrieve, via a file monitor, a file and policy data from a case management system or a content management system, wherein the file and the policy data are retrieved in response to detecting a user request for the file. The device can also modify, via the file monitor, access to the file based on the policy data and intercept, via the file monitor, a plurality of document management instructions executed with the file. Additionally, the device can detect, via the file monitor, at least one of the document management instructions is a malicious action, wherein the malicious action is detected based on the policy data, and wherein the policy data is updated in response to detecting each of the document management instructions. Furthermore, the device can execute, via the file monitor, a policy instruction to prevent execution of the at least one document management instruction.

Accordingly, the techniques described herein can prevent unauthorized access to a document based on a modified access policy. For example, the techniques described herein can prevent a user from performing unauthorized actions with a document, wherein the unauthorized actions are based on policy changes implemented subsequent to the user retrieving the document.

Figure 1:
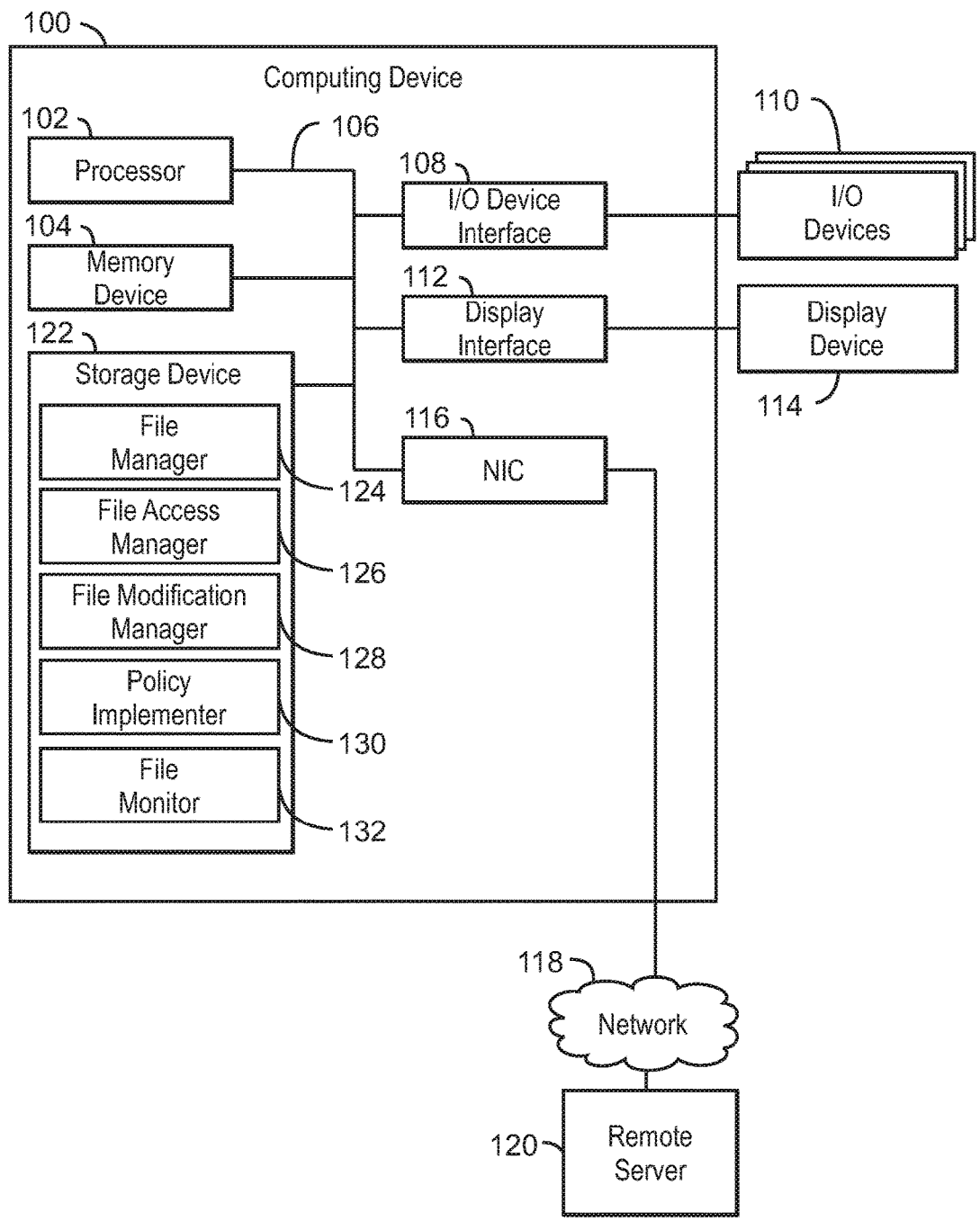
FIG. 1 depicts a block diagram of an example computing system that can manage access to documents with a file monitor according to an embodiment described herein.

With reference now to FIG. 1, an example computing device is depicted that can manage access to documents with a file monitor. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote server 120 may connect to the computing device 100 through the network 118.

The processor 102 may also be linked through the system interconnect 106 to a storage device 122 that can include a hard drive, an optical drive, a USB flash drive, an array of drives, or any combinations thereof. In some examples, the storage device 122 may include a file manager 124, a file access manager 126, a file modification manager 128, and a policy implementer 130. In some embodiments, the file manager 124 can retrieve a file and policy data from a case management system or a content management system, wherein the file and the policy data are retrieved in response to detecting a user request for the file. In some embodiments, the file access manager 126 can modify access to the file based on the policy data. In some embodiments, the file modification manager 128 can intercept a plurality of document management instructions executed with the file. The file modification manager 128 can also detect at least one of the document management instructions is a malicious action, wherein the malicious action is detected based on the policy data, wherein the policy data is updated in response to detecting each of the document management instructions. Furthermore, the policy implementer 130 can execute a policy instruction to prevent execution of the at least one document management instruction.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the file manager 124, file access manager 126, file modification manager 128, and policy implementer 130 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the file manager 124, file access manager 126, file modification manager 128, and policy implementer 130 can be implemented with logic, wherein the logic, as referred to herein, can include any suitable hardware (e.g., a processor, among others), software (e.g., an application, among others), firmware, or any suitable combination of hardware, software, and firmware. For example, a file monitor 132 can reside in the storage device 122 and can implement the functionalities of the file manager 124, file access manager 126, file modification manager 128, and policy implementer 130.

Figure 2:
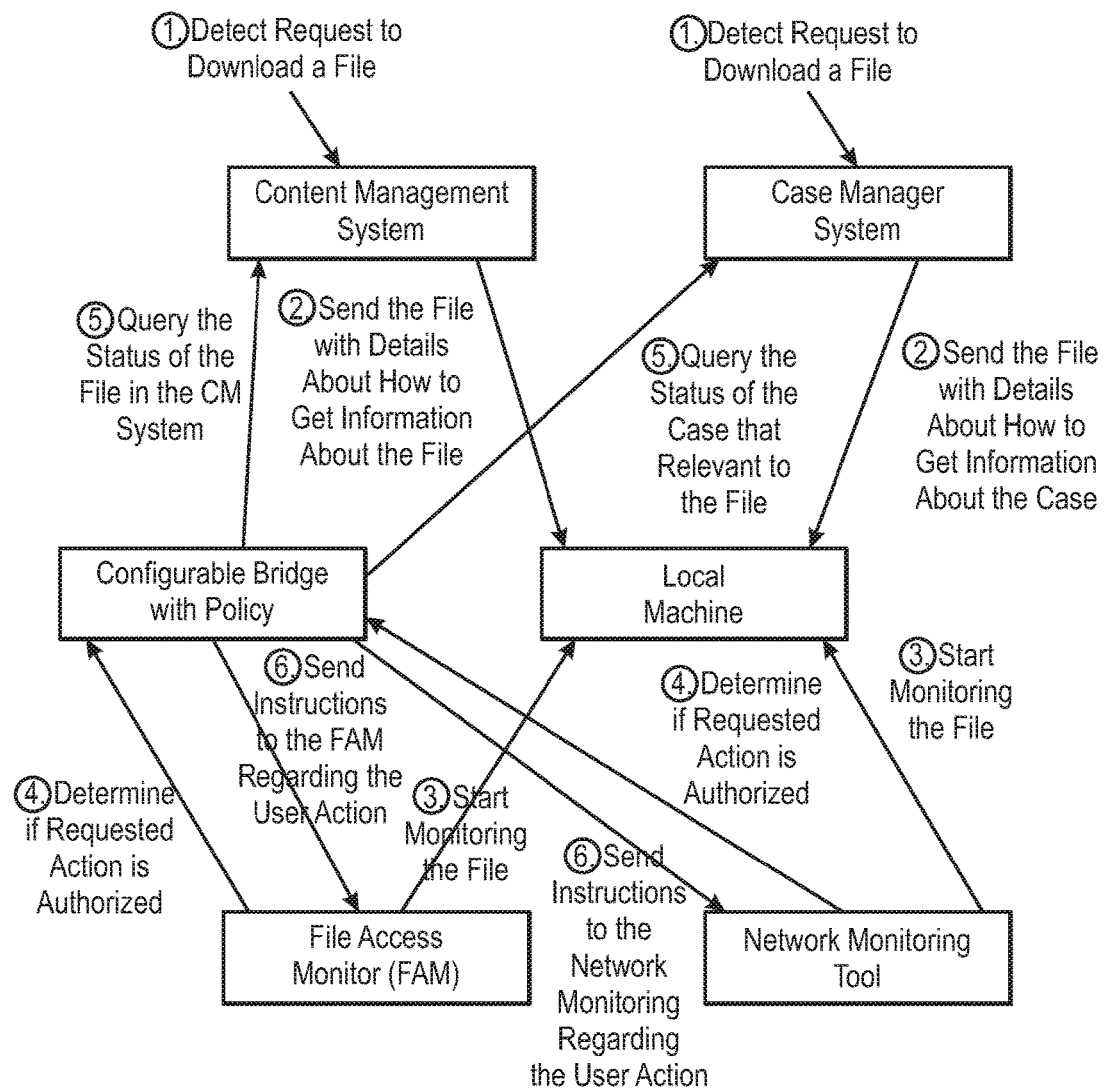
FIG. 2 is an example timing diagram illustrating techniques for managing access to documents described herein.

FIG. 2 is an example timing diagram illustrating techniques for managing access to documents described herein. At the circled number one (1), a content management system or a case management system can detect a user request to download or retrieve a file. In some embodiments, the case management system, as referred to herein, can include any suitable remote computing device that stores files for a user to access and policy data based on a task. A task, as referred to herein, can include any suitable action to be performed by a user such as generating a document based on files stored in the case management system. In some embodiments, the files to be retrieved and policy data can reside in a content management system. A content management system, as referred to herein, can enable users to access particular files regardless of a task. For example, a user can retrieve or download a file from a content management system and access or modify the retrieved file based on policy data stored in the content management system.

At the circled number two (2), the content management system or the case manager system can transmit or send a requested file to a local machine along with details indicating how to obtain information about the file. In some examples, the details correspond to policy data, which can include permissions for a user or a group of users in relation to a file. For example, the policy data can indicate if data is to be redacted or masked within a retrieved file for users, whether the retrieved files can be copied, and files with certain file types that can be generated based on the retrieved file, among others.

At the circled number three (3), a file agent monitor and a networking tool can monitor the retrieved file on a local machine. For example, the file agent monitor and the networking tool can monitor instructions executed with the retrieved file. In some embodiments, the file agent monitor and the networking tool can reside on the local machine. In some embodiments, the networking tool can reside on any suitable external computing device such as a network switch, or a router, among others.

At the circled number four (4), the file agent monitor or the networking tool can detect an attempt to execute an instruction on the local machine with the retrieved file and transmit the instruction to a configurable bridge to verify that a user is authorized to perform the instruction. For example, the instruction may include copying the retrieved file, accessing the retrieved file, transmitting the retrieved file to another user or group of users, or transmitting the file to another network internet address, among others. In some embodiments, the configurable bridge can reside on the local machine or reside on any suitable external computing device.

At the circled number five (5), the configurable bridge can query a status of the retrieved file corresponding to the instruction that has been attempted to be executed on the local machine. In some examples, the configurable bridge can query the original source for the retrieved file such as the content management system or the case management system. The status can indicate if policy data has been modified since the retrieved file was transmitted to the local machine. For example, the status can indicate if a user is no longer authorized to access a retrieved file or if a user is no longer authorized to access particular content within a retrieved file, among others. In some embodiments, the status can indicate that sensitive or confidential information in a retrieved file is to be redacted or masked.

At the circled number six (6), the configurable bridge can transmit approval or disapproval of the requested instruction to the file agent monitor or the networking tool. For example, the configurable bridge can transmit an indication that the instruction that was attempted to be executed on the local machine can be executed or is to be blocked by the file agent monitor or the networking tool.

The timing diagram 200 of FIG. 2 illustrates one example implementation of the operations described herein. In some embodiments, the operations of the timing diagram 200 can be executed in any particular order, and may include fewer or additional operations.

Figure 3:
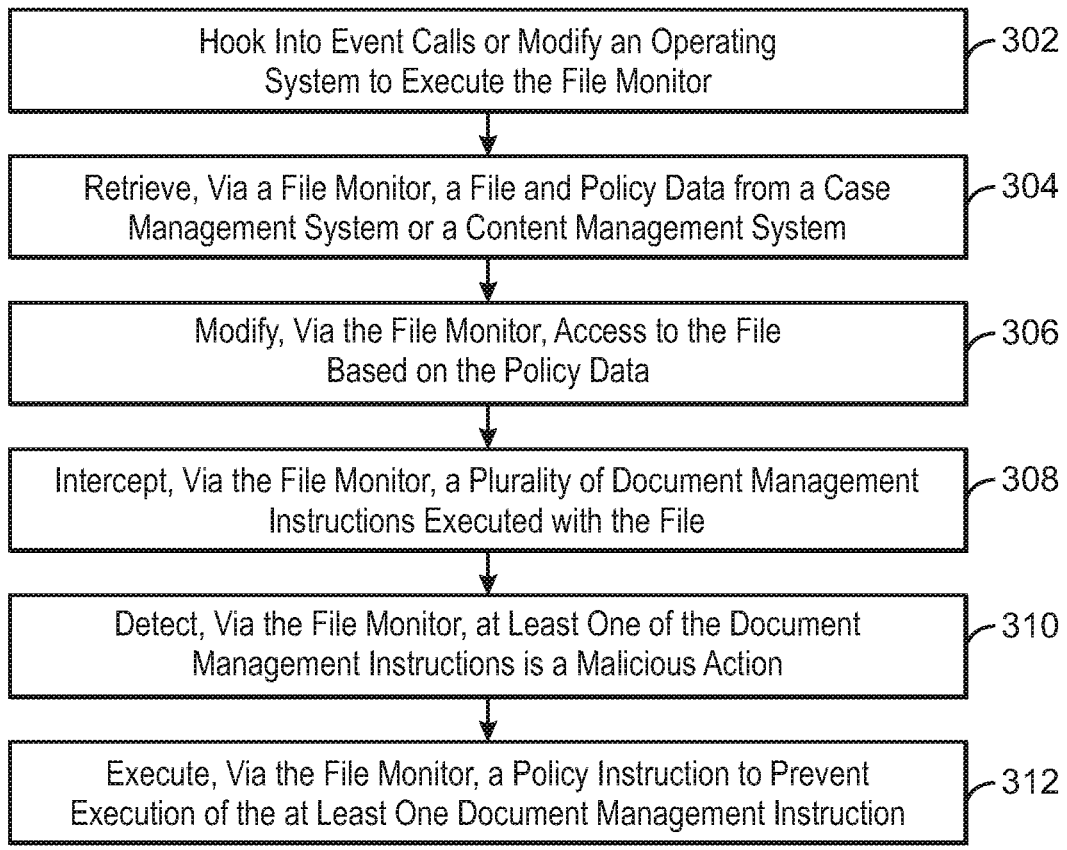
FIG. 3 is a process flow diagram of an example method that can manage access to documents with a file monitor according to an embodiment described herein.

FIG. 3 is a process flow diagram of an example method that can manage access to documents. The method 300 can be implemented with any suitable computing device, such as the computing device 100 of FIG. 1.

At block 302, a file manager 124 can hook into event calls or modify an operating system to execute the file monitor, wherein the file monitor is to monitor, at a kernel level of the operating system, a plurality of system calls involving locally stored files. In some embodiments, hooking into an event call can include inserting hooks into a process that enables an application or operating system to intercept functions calls, messages, or events, among others, passed between various software components. For example, hooking into an event call can enable an application or process to intercept keyboard or mouse event messages before the keyboard or mouse messages reach an application. In some embodiments, the file manager 124 can modify an operating system to execute a file monitor. For example, the file manager 124 can modify the operating system to load an additional library module or the file manager 124 can modify the import table of an executable. In some embodiments, the file manager 124 can hook into event calls or modify an operating system to execute the file monitor, wherein the file monitor is to monitor, at a kernel level of the operating system, a plurality of system calls involving locally stored files. In some embodiments, the file manager 124 can modify a function associated with an application used to access the file, wherein the function comprises a print function or a copy to a temporary storage function.

At block 304, the file manager 124 can retrieve, via a file monitor, a file and policy data from a case management system or a content management system, wherein the file and the policy data are retrieved in response to detecting a user request for the file. In some embodiments, the case management system, as referred to herein, can include any suitable remote computing device that stores files for a user to access and policy data based on a task. A task, as referred to herein, can include any suitable action to be performed by a user such as generating a document based on files stored in the case management system. The policy data, as referred to herein, can include permissions for a user or a group of users in relation to a file. For example, the policy data can indicate if data is to be redacted or masked within a retrieved file for users, whether the retrieved files can be copied, and files with certain file types that can be generated based on the retrieved file, among others. In some embodiments, the policy data can indicate an application that is authorized to access the file or a list of file types that are authorized to be generated from the file based on the policy data. For example, a spreadsheet may be prohibited from being converted to a text file. In some embodiments, the files to be retrieved and policy data can reside in a content management system. As discussed above, a content management system can enable users to access particular files regardless of a task. For example, a user can retrieve or download a file from a content management system and perform tasks with the retrieved file based on policy data stored in the content management system.

In some embodiments, the file manager 124 can retrieve a copy of a file based on a link to an original file in the case management system or content management system. In some embodiments, the file manager 124 can retrieve a file in an encrypted format, wherein the policy data indicates a predetermined encryption key to be used to access the file in the encrypted format. In some embodiments, the file manager 124 can retrieve metadata corresponding to the file from policy data or as a separate data stream. The metadata can indicate a particular remote device that hosts the retrieved file, the file name on the host device, a creation date of the file on the host device, a user or group of users with administrative access to the file on the host device, if the file includes sensitive information such as financial information or personal information, and the like.

At block 306, the file access manager 126 can modify, via the file monitor, access to the file based on the policy data. In some embodiments, the file access manager 126 can apply restrictions to access a file based on policy data. The file access manager 126 can be a locally stored application or process that can modify access to a retrieved file. In some embodiments, the file access manager 126 can prevent particular users or groups of users from accessing a retrieved file, redact or mask portions of retrieved documents, prevent retrieved files from being copied, prevent printing retrieved files, and the like. In some embodiments, the file access manager 126 can identify sensitive information and mask the sensitive information by replacing the sensitive information with pseudorandom alphanumeric characters.

At block 308, the file access manager 126 can intercept, via the file monitor, a plurality of document management instructions executed with the file. In some embodiments, the file access manager 126 can intercept document management instructions corresponding to a retrieved file. The document management instructions, as referred to herein, can include any instruction performed based on the retrieved file.

At block 310, the file modification manager 128 can detect, via the file monitor, at least one of the document management instructions is a malicious action, wherein the malicious action is detected based on the policy data. In some examples, the policy data can be updated in response to detecting each of the document management instructions. For example, the file modification manager 128 can detect each document management instruction for a retrieved file and send a request to a case management system or a content management system to determine if policy data for the retrieved file has been modified. In some embodiments, a status of a case in a case management system can be modified without modifying the file policy data in a remote system and a file monitoring application residing on the remote system can change access permissions to a file in response to determining that the status of the case has changed. For example, if the case was owned by a first user and then moved to a second user, the system can redact any document that is accessed by the first user. If the policy data has been modified, the file modification manager 128 can update the policy data stored locally and determine if access to the file is to be prevented based on the updated policy data. If the policy data has not been modified, the file modification manager 128 can determine if access to a retrieved file is to be prevented based on the original policy data.

The file modification manager 128 can detect a malicious document management instruction or action that attempts to access portions of a document that are unauthorized for a user or a group of users, or attempts to copy the retrieved file to a removable storage device, among others. In some embodiments the malicious action can include modifying a user's access to include root access. In some examples, the malicious action can include encrypting the file with an unknown source or encryption key. In some examples, the malicious action can include transferring the file to an unauthorized group of users. In some embodiments, a malicious action can include a user attempting to transmit a password used to access the retrieved file to another user via electronic mail. In some examples, a malicious action can also include a user attempting to access a document with an expired password that was updated subsequent to the original retrieval of the document.

At block 312, the policy implementer 130 can execute, via the file monitor, a policy instruction to prevent execution of the at least one document management instruction. The policy implementer 130 can detect that a user has attempted to execute a document management instruction that is prohibited by the policy data. The policy implementer 130 can prevent the document management instruction from being executed and transmit an alert to a case management system or a content management system. For example, the policy implementer 130 can detect that a user attempted to execute a document management instruction that transmitted a retrieved document to unauthorized users. The policy implementer 130 can generate and transmit a notification or email to the case management system or the content management system indicating the unauthorized document management instruction. In some embodiments, the policy implementer 130 can prevent a user from accessing any retrieved documents from a case management system or a content management system following an attempt by the user to perform a malicious action.

In some embodiments, the policy implementer 130 can block a system call to access a retrieved file in response to detecting a user of the operating system is unauthorized to access the file based on the policy data. In some embodiments, the policy implementer 130 can detect a transfer of a file to a remote device and alert a network monitoring tool to determine if the transfer to the remote device violates the policy data. In some embodiments, the policy instruction can include redacting sensitive data, masking sensitive data, or preventing an operating system from changing a file type of the file to a second file type.

The process flow diagram of FIG. 3 is not intended to indicate that the operations of the method 300 are to be executed in any particular order, or that all of the operations of the method 300 are to be included in every case. For example, the method 300 can include detecting sensitive data in the file, detecting a second retrieved file from a case management system with a similarity to the file above a threshold value, and modifying a policy for the second file to indicate that the second file comprises sensitive data. In some examples, the method 300 can include masking or redacting sensitive information in the second file based on the similarity to the first file. Sensitive information, as referred to herein, can include financial information, government issued identification information, personal information such as a date of birth, and the like. In some embodiments, the similarity of two files can indicate that two files both include fields populated with the sensitive information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
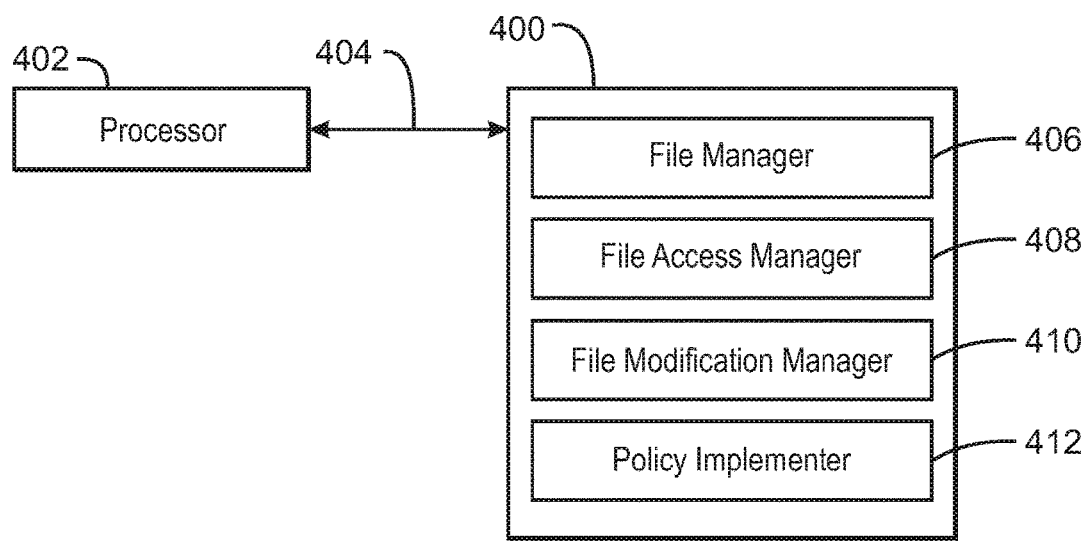
FIG. 4 is a tangible, non-transitory computer-readable medium that can manage access to documents with a file monitor according to an embodiment described herein.

Referring now to FIG. 4, a block diagram is depicted of an example of a tangible, non-transitory computer-readable medium that can manage access to documents with a file monitor. The tangible, non-transitory, computer-readable medium 400 may be accessed by a processor 402 over a computer interconnect 404.

Furthermore, the tangible, non-transitory, computer-readable medium 400 may include code to direct the processor 402 to perform the operations of the current method. For example, a file manager 406 can hook into event calls or modify an operating system to execute the file monitor, wherein the file monitor is to monitor, at a kernel level of the operating system, a plurality of system calls involving locally stored files. In some embodiments, the file manager 406 can also retrieve, via a file monitor, a file and policy data from a case management system or a content management system, wherein the file and the policy data are retrieved in response to detecting a user request for the file. In some embodiments, a file access manager 408 can modify, via the file monitor, access to the file based on the policy data. In some embodiments, a file modification manager 410 can intercept, via the file monitor, a plurality of document management instructions executed with the file. The file modification manager 410 can also detect, via the file monitor, at least one of the document management instructions is a malicious action, wherein the malicious action is detected based on the policy data, and wherein the policy data is updated in response to detecting each of the document management instructions. Furthermore, a policy implementer 412 can execute, via the file monitor, a policy instruction to prevent execution of the at least one document management instruction.

It is to be understood that any number of additional software components not shown in FIG. 4 may be included within the tangible, non-transitory, computer-readable medium 400, depending on the specific application. For example, a file monitor can also reside on the non-transitory computer-readable medium 400, which can implement the functionalities of the file manager 406, file access manager 408, file modification manager 410, and policy implementer 412. Furthermore, fewer software components than those shown in FIG. 4 can be included in the tangible, non-transitory, computer-readable medium 400.

Figure 5:
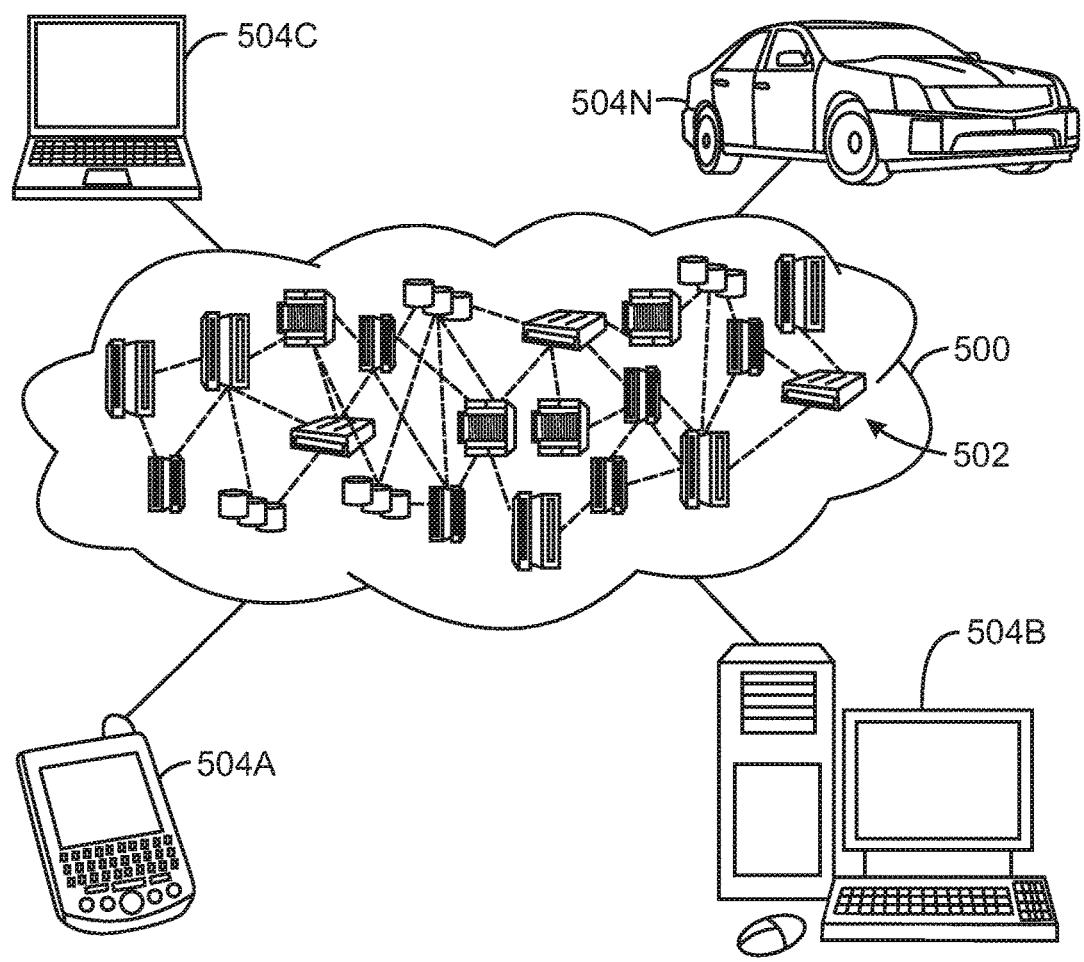
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
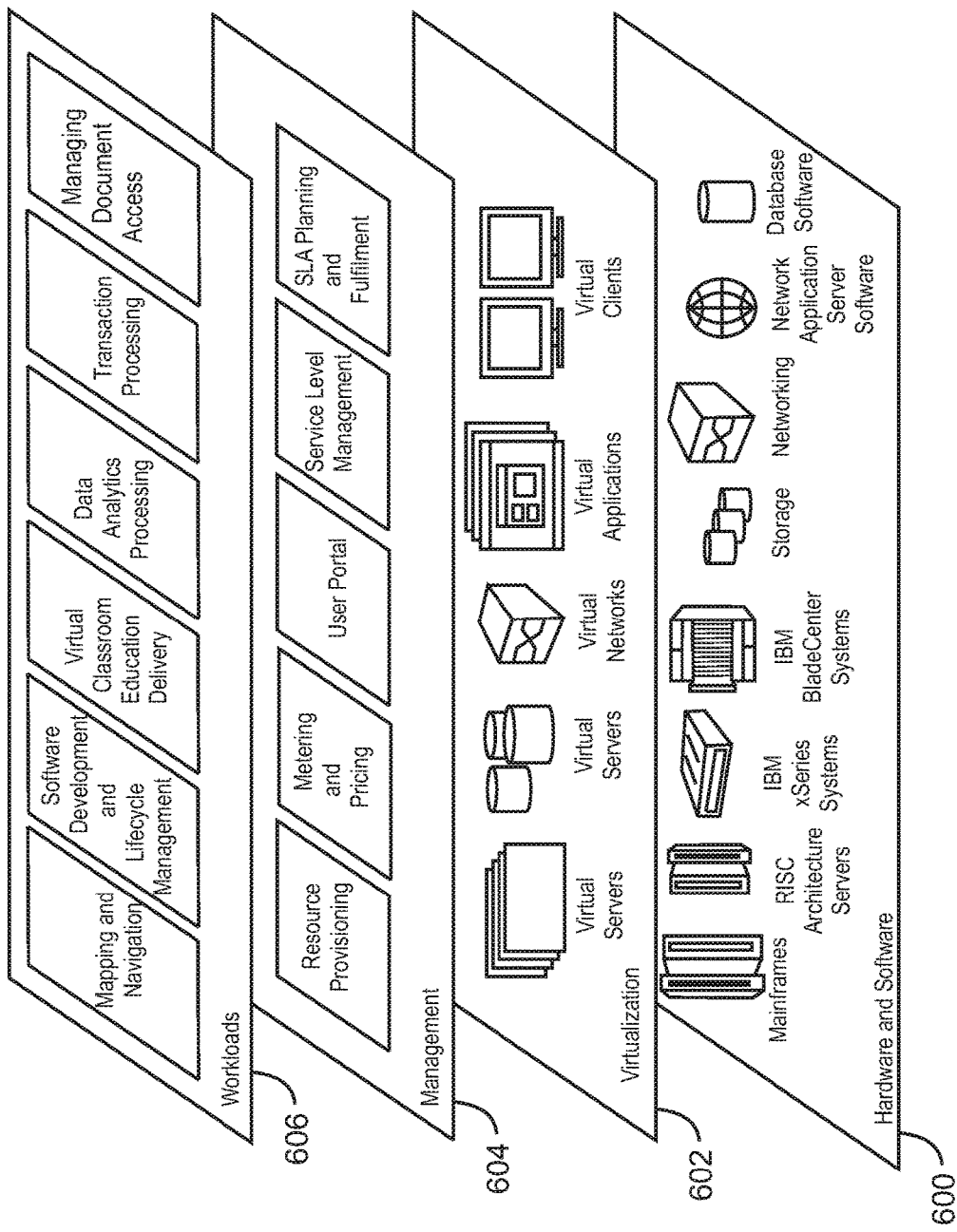
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing access to documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing access to documents comprising: a hardware processor to: retrieve, via a file monitor, a file and policy data from a case management system or a content management system, wherein the file and the policy data are retrieved in response to detecting a user request for the file; modify, via the file monitor, access to the file based on the policy data; intercept, via the file monitor, a plurality of document management instructions executed with the file; detect, via the file monitor, at least one of the document management instructions is a malicious action, wherein the malicious action is detected based on the policy data, wherein the policy data is updated in response to detecting each of the document management instructions; and execute, via the file monitor, a policy instruction to prevent execution of the at least one document management instruction; detect sensitive data in the file; detect a second retrieved file from the case management system with a similarity to the file above a threshold value; and modify a policy for the second file to indicate that the second file comprises sensitive data.

2. The system of claim 1, wherein the processor is to block a system call to access the file in response to detecting a user of the operating system is unauthorized to access the file based on the policy data.

3. The system of claim 1, wherein the processor is to detect a transfer of the file to a remote device and alert a network monitoring tool to determine if the transfer to the remote device violates the policy data.

4. The system of claim 1, wherein the policy data indicates an application that is authorized to access the file.

5. The system of claim 1, wherein the policy data indicates a list of file types that are authorized to be generated from the file based on the policy data.

6. The system of claim 1, wherein the processor is to retrieve a copy of the file based on a link to an original file in the case management system.

7. The system of claim 1, wherein the processor is to retrieve the file in an encrypted format, wherein the policy data indicates a predetermined encryption key to be used to access the file in the encrypted format.

8. The system of claim 1, wherein the malicious action comprises modifying a user's access to include root access.

9. The system of claim 1, wherein the malicious action comprises copying the file to a removable device.

10. The system of claim 1, wherein the malicious action comprises encrypting the file with an encryption key from an unknown source.

11. The system of claim 1, wherein the malicious action comprises transferring the file to an unauthorized group of users.

12. The system of claim 1, wherein the policy instruction comprises preventing the operating system from changing a file type of the file to a second file type.

13. The system of claim 1, wherein the processor is to hook into event calls or modify an operating system to execute the file monitor, wherein the file monitor is to monitor, at a kernel level of the operating system, a plurality of system calls involving locally stored files.

14. The system of claim 13, wherein the processor is to modify a function associated with an application used to access the file, wherein the function comprises a print function or a copy to a temporary storage function.

15. A method for managing access to documents comprising: retrieving, via a file monitor, a file and policy data from a case management system or a content management system, wherein the file and the policy data are retrieved in response to detecting a user request for the file; modifying, via the file monitor, access to the file based on the policy data; intercepting, via the file monitor, a plurality of document management instructions executed with the file; detecting, via the file monitor, at least one of the document management instructions is a malicious action, wherein the malicious action is detected based on the policy data, wherein the policy data is updated in response to detecting each of the document management instructions; and executing, via the file monitor, a policy instruction to prevent execution of the at least one document management instruction; detect sensitive data in the file; detect a second retrieved file from the case management system with a similarity to the file above a threshold value; and modify a policy for the second file to indicate that the second file comprises sensitive data.

16. The method of claim 15, wherein the policy data indicates a list of file types that are authorized to be generated from the file based on the policy data.

17. A computer program product for managing access to documents, the computer program product comprising a computer readable storage medium having program instructions embodied therewith, wherein the computer readable storage medium is not a transitory signal per se, the program instructions executable by a processor to cause the processor to: hook into event calls or modify an operating system to execute a file monitor, wherein the file monitor is to monitor, at a kernel level of the operating system, a plurality of system calls involving locally stored files; retrieve, via the file monitor, a file and policy data from a case management system or a content management system, wherein the file and the policy data are retrieved in response to detecting a user request for the file; modify, via the file monitor, access to the file based on the policy data; intercept, via the file monitor, a plurality of document management instructions executed with the file; detect, via the file monitor, at least one of the document management instructions is a malicious action, wherein the malicious action is detected based on the policy data, wherein the policy data is updated in response to detecting each of the document management instructions; and execute, via the file monitor, a policy instruction to prevent execution of the at least one document management instruction; detect sensitive data in the file; detect a second retrieved file from the case management system with a similarity to the file above a threshold value; and modify a policy for the second file to indicate that the second file comprises sensitive data.

\* \* \* \* \*